Jan. 19, 1971 H. D. HUME ET AL 3,555,795
SUPPORT APPARATUS FOR HARVESTING EQUIPMENT
Filed Dec. 6, 1968 4 Sheets-Sheet 1

INVENTORS.
HORACE D. HUME
BYRON M. NOVAK
BY
Wells & St. John
Attys.

Jan. 19, 1971  H. D. HUME ET AL  3,555,795
SUPPORT APPARATUS FOR HARVESTING EQUIPMENT
Filed Dec. 6, 1968  4 Sheets-Sheet 3

INVENTORS.
HORACE D. HUME
BYRON M. NOVAK
BY
Wells & St John
Attys.

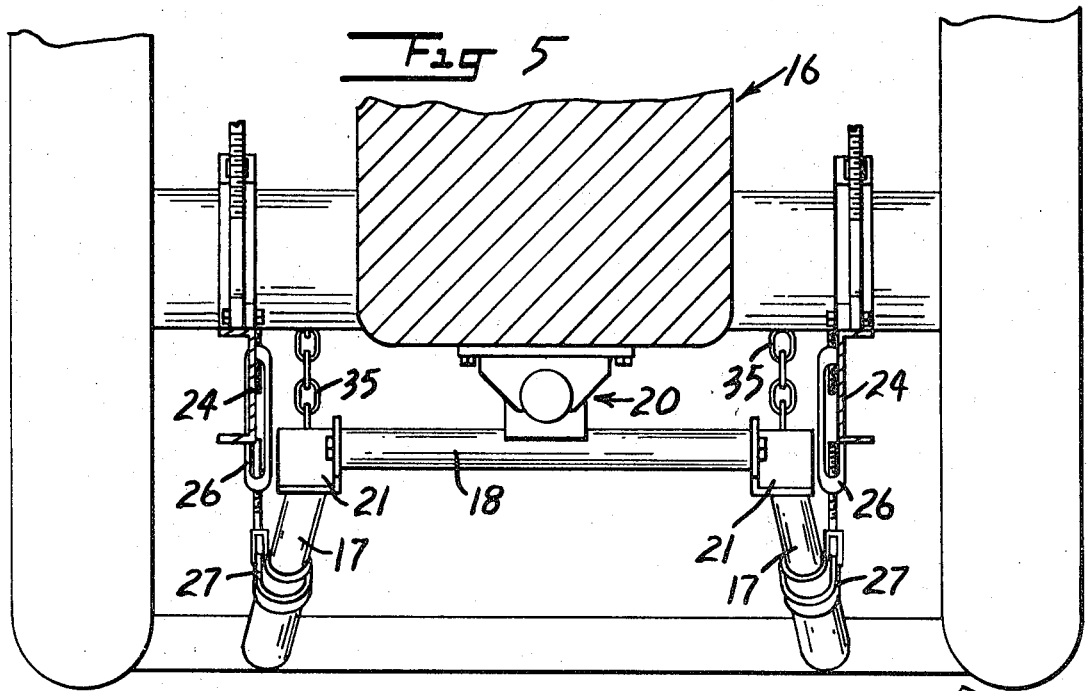
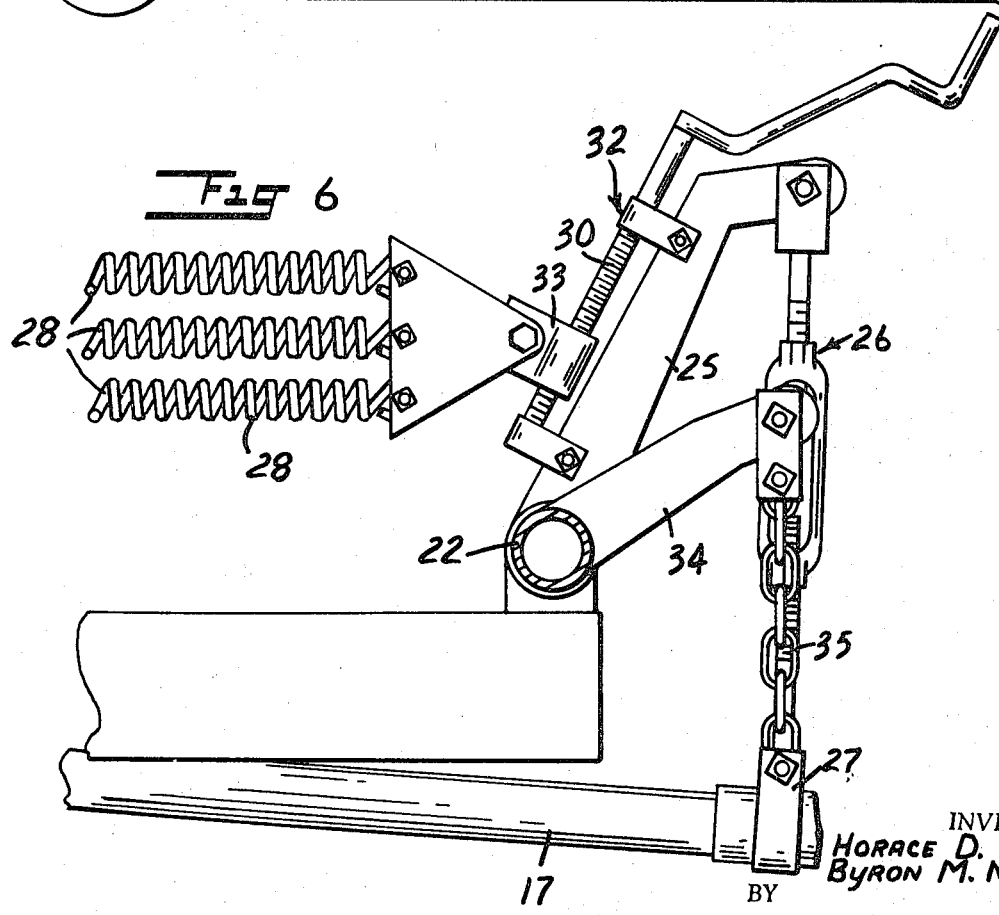

United States Patent Office 3,555,795
Patented Jan. 19, 1971

3,555,795
SUPPORT APPARATUS FOR HARVESTING EQUIPMENT
Horace D. Hume, % H. D. Hume Co., Mendota, Ill. 61342, and Byron M. Novak, 1580 Tonti St., La Salle, Ill. 61301
Filed Dec. 6, 1968, Ser. No. 781,882
Int. Cl. A01d 67/00
U.S. Cl. 56—208          3 Claims

ABSTRACT OF THE DISCLOSURE

A support apparatus for push-type harvesting equipment that is spring counterbalanced so as to "float" in contact with the field surfaces or in close proximity thereto. The harvesting equipment, in the form of a sickle bar and reel, is supported forwardly of a tractor vehicle frame by two transverse header bars which extend longitudinally under a substantial part of the vehicle frame. The forward end of each header bar is fixed to the harvester apparatus. The rear ends of the header bars are movably connected to the vehicle frame about a swivel connection that permits one end of the header to move vertically relative to the other. A center stabilizing connection between the harvesting apparatus and vehicle frame prevents lateral movement of the harvesting apparatus. Adjustable spring counterbalance supports and hydraulically operated lifting devices are provided for proper elevational control of the harvester equipment.

BACKGROUND OF THE INVENTION

A prior support apparatus including adjustable spring counterbalance means is shown in the H. D. Hume U.S. Pat. No. 2,955,813. In this structure a pair of header bars or frame supports extend rearwardly from the harvesting apparatus. They are pivotally mounted to the tractor frame about a common fixed transverse axis. This provides free vertical pivotal movement of the harvester equipment. However, there is no provision for permitting one side of the harvester equipment to move vertically relative to the opposite side, as is sometimes necessary in uneven or sloping terrain. The harvester equipment, if it is to remain in close proximity to the ground, must sometimes assume an angular position with respect to the position of the tractor frame, which is supported by wheels located rearwardly of the harvester equipment. This is accommodated to some extent in prior devices by the flexibility of the apparatus, but presents considerable strain in the individual members, some of which are occasionally loaded beyond their individual abilities. This leads to structural failure or to damage at the pivotal connections or bearings.

To overcome these prior difficulties, the structure shown herein mounts the header bars for the harvester frame about a common swivel connection that permits universal movement of the transversely spaced header bars and of the harvester frame rigidly fixed to them. The connection of the harvester frame to the vehicle frame therefore accommodates transverse pivotal movement as well as vertical movement of the harvester apparatus relative to the vehicle frame. An auxiliary restraining member is used to prevent lateral movement of the harvester apparatus relative to the vehicle frame while not impeding the ability of the frame to move in a vertical plane. In addition, individual bellcranks at each side of the apparatus provide proper adjustable counterbalancing for the weight of the harvester apparatus. A positive lifting apparatus is used when it is desired to raise the harvester apparatus or limit its downward movement relative to the vehicle frame.

It is a first object of this invention to provide a forwardly mounted harvester apparatus on a supporting tractor vehicle frame wherein the harvester apparatus is free to move in a substantially vertical plane and wherein vertical movement of one side of the harvester apparatus can be freely accommodated with respect to its opposite side.

It is another object of this invention to provide such freedom of movement in a simplified mechanical design in relation to prior mounting supports for such harvester devices.

Another object of this invention is to provide freedom of movement of the harvester apparatus in a substantially vertical plane, while limiting the freedom of movement of the harvester apparatus in a transverse direction.

Another object of the invention is to provide such freedom of movement in a harvester apparatus that is spring biased with respect to the vehicle frame to adequately counterbalance the weight of the harvester apparatus. There also is provided manually operable means for lifting the harvester apparatus or limiting downward movement thereof. The counterbalancing connections, lifting devices and transverse movement limiting elements are all mounted on the tractor frame about a common transverse shaft for simplicity of structure and operation.

SUMMARY OF THE INVENTION

The basic invention relates to an improvement in the mounting or support apparatus for a harvesting device supported by a tractor, the improvement comprising the use of transversely spaced header bars that extend along the tractor frame and which are secured at their forward ends to the harvesting apparatus. A pivotal mounting device connects the rear end of each header bar to the tractor and permits vertical movement of each end of the harvesting apparatus independent of the remaining end thereof. There is also provided restraining means between the tractor frame and harvester apparatus to prevent lateral movement of the harvester apparatus relative to the tractor frame. A counterbalancing device is provided between the tractor frame and the harvesting apparatus to overcome the weight of the harvesting apparatus and to permit it to "float" against or in close proximity to the field surface. There also is provided a lifting mechanism for selectively raising the harvester by means of the header bars.

BRIEF DESCRIPTION OF THE DRAWINGS

FIG. 5 is an enlarged sectional view taken along line 5—5 in FIG. 1; and

FIG. 6 is an enlarged cross sectional view taken substantially along line 6—6 in FIG. 2.

DESCRIPTION OF THE PREFERRED EMBODIMENT

Push type harvesters are mounted to a tractor or other supporting vehicle in such manner as to be pushed forwardly of the vehicle to cut and windrow the crop being harvested. This type of harvesting apparatus is preferable over types that are pulled through a field because the vehicle follows the cutting mechanism and therefore does not crush the crop prior to harvesting. The forward mount of the harvester also permits the harvesting apparatus to be carried entirely by the powered vehicle for vertical adjustment as required to conform to ground contour at crop height. However, since the harvesting equipment must be mounted at a position considerably forward of the tractor, it is necessary to accommodate variations in the angular position of the harvesting apparatus relative to the position of the vehicle.

Figure 1:
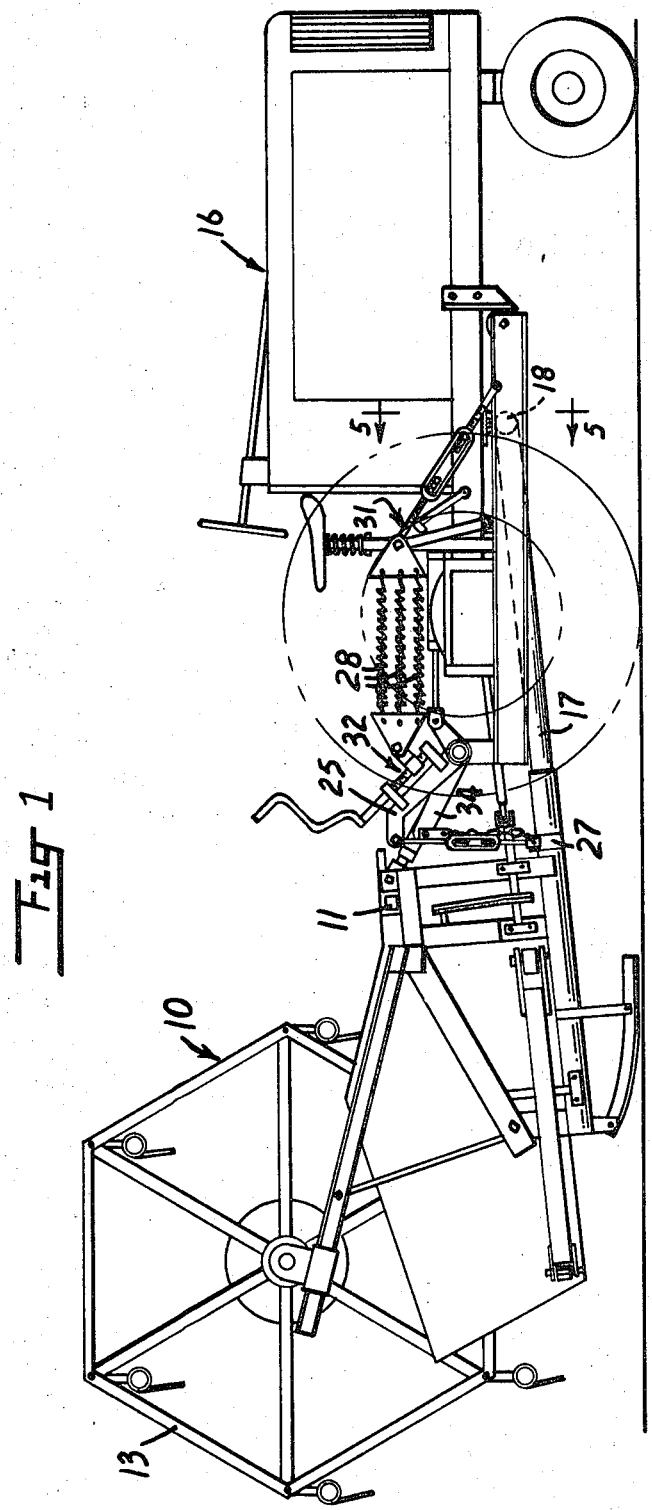
FIG. 1 is a side elevation view of the present apparatus mounted on a tractor, the large tractor wheel at the front side of the drawing being not illustrated in order to permit the mounting apparatus to be shown.
Figure 2:
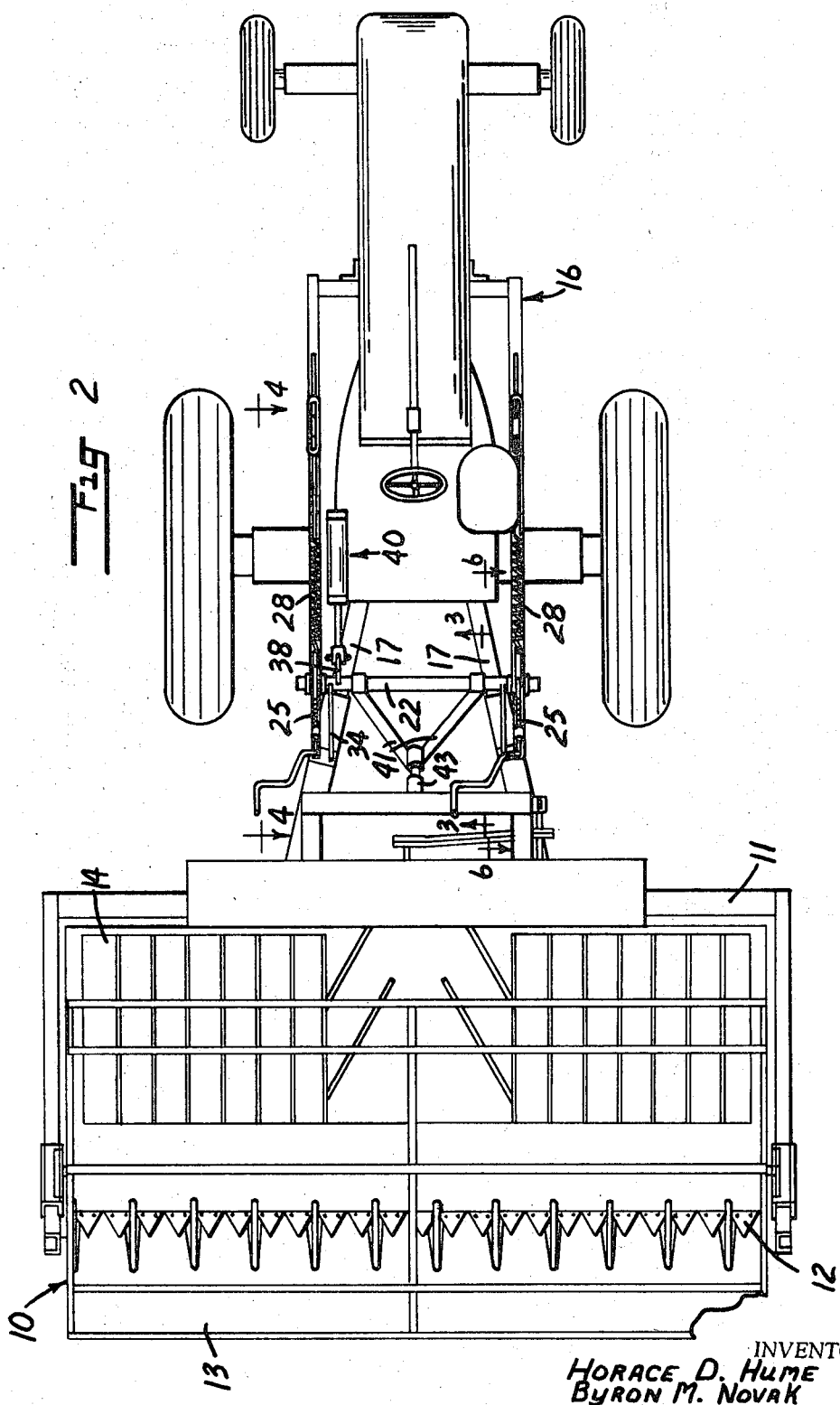
FIG. 2 is a top view of the structure shown in FIG. 1.

Referring generally to FIGS. 1 and 2, the device is shown in combination with a cutting and windrowing harvester apparatus, generally indicated by numeral 10. This includes a main frame 11 that supports a cutting mechanism 12 (a conventional sickle), a reel 13, a transverse windrow apparatus 14, opposed drapers and central windrowing rods. The elements 12, 13 and 14 are driven by a power take-off (not shown) of a tractor 16 upon which the harvester 10 is supported. The drive connections between the tractor and harvesting apparatus are of a conventional flexible nature to permit freedom of movement of the harvester apparatus relative to the tractor without disengagement of the drive connections. The details of construction of the harvester 10 and the drive means for the various elements are not disclosed herein since such devices are old and well known in the art.

As shown in FIGS. 1 and 2, the harvester 10 is mounted at the normal rear of the tractor 16. However, since the apparatus is designed for movement to the left as shown in FIGS. 1 and 2, and the tractor 16 is driven in what would normally be its reverse direction, the end of the tractor 16 at which the harvester 10 is mounted will be referred to herein as its front end. The terms "forward," "forwardly" and "front" as used in this description shall indicate the end of the tractor 16 at which the harvester 10 is mounted. The opposite terms "rearward" etc. shall indicate the direction to the right in FIGS. 1 and 2.

The essential support structure for the harvester apparatus 10 is in the form of two rigid elongated header bars 17. The header bars 17 are transversely spaced and extend rearwardly from the harvester apparatus 10 in a general longitudinal direction. Each header bar 17 is fixed at its forward end to the frame 11. At their rear ends, the header bars 17 are each fixedly secured to opposite ends of a transverse rigid bar 18 by means of brackets 21 (FIG. 5). The transverse bar 18 is movably connected to the frame of tractor 16 by means of a universal swivel connection of conventional manufacture, shown generally at 20. The swivel connection 20 is of a type that will permit free movement of the bar 18 in any angular direction. Specifically, the swivel connection 20 will permit bar 18 to pivot about a longitudinal central axis along the tractor 16 and will also permit bar 18 to pivot relative to the tractor frame about an axis parallel to the longitudinal center axis of the bar 18.

At the front of tractor 16 is mounted a transverse shaft 22. The shaft 22 is pivotally supported by bearings 23 adjacent to its respective ends and fixedly mounted to a conventional longitudinal frame member 24 on the tractor 16. Shaft 22 is therefore pivotable about its central longitudinal axis, which is a fixed transverse axis on the frame of tractor 16.

Proceeding inwardly from each bearing 23 along shaft 22, there is first a bell crank 25 rotatably mounted on shaft 22 for pivotal movement about the axis of shaft 22. The bellcrank 25 is journalled on shaft 22 by a conventional sleeve bearing. Its outer end is connected to the header bar 17 beneath it by means of an adjustable rigid link 26. The link 26 can be lengthened or shortened by operation of a conventional turnbuckle. Link 26 is pivoted to the bell crank 25 and to a bracket 27 on the header bar 17 about respective axes which are parallel to the central axis of shaft 22.

Figure 4:
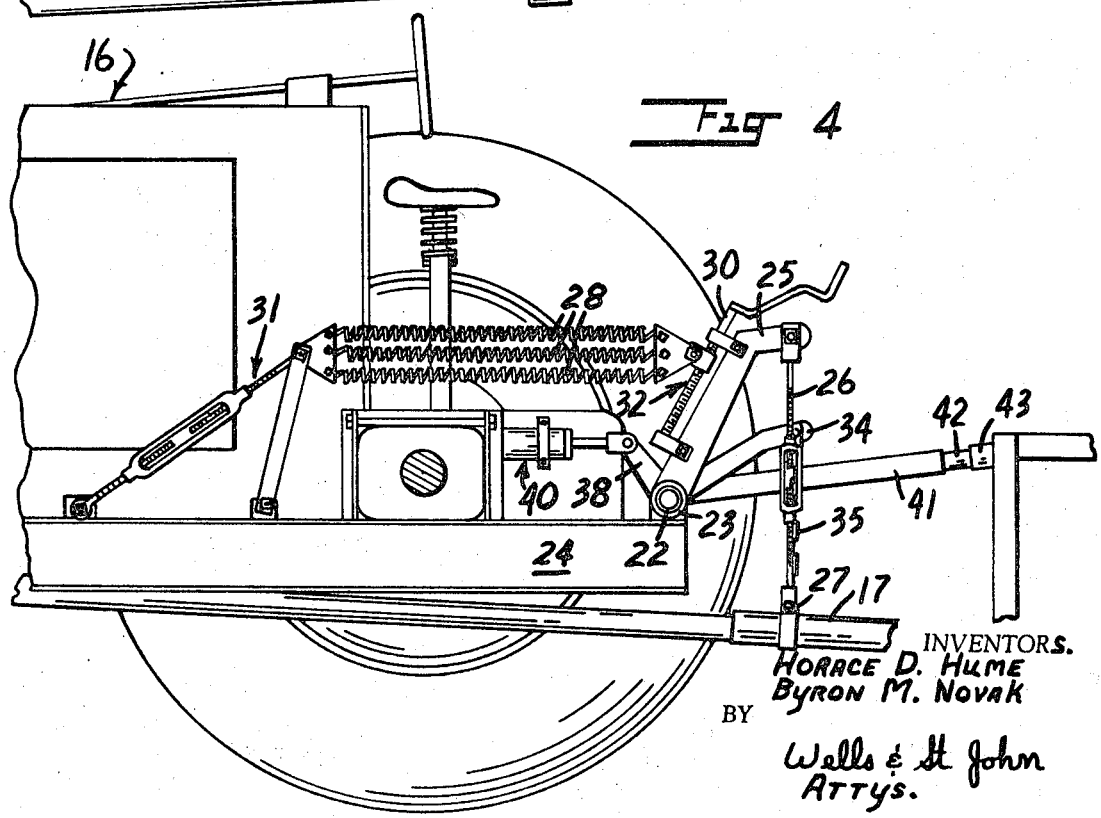
FIG. 4 is an enlarged sectional view taken substantially along line 4—4 in FIG. 2.

To provide effective counterbalancing of the weight of the harvester apparatus 10, a series of tension springs 28 are operatively connected between the frame of tractor 16 and the bellcrank 25. The springs 28 are anchored at their rear ends to an adjustable bracket linkage shown generally at 31 (FIG. 4). The front ends of springs 28 are anchored to a bracket 32 which can be translated along the radial length of bellcrank 25 by means of a rotatable screw 30 and threaded collar 33. This adjustment of springs 28 in order to accomplish effective counterbalancing of the weight of the harvester apparatus 10 is essentially that previously described in U.S. Pat. No. 2,955,813 discussed above.

Inwardly adjacent to each bellcrank 25 is a lifting crank 34 fixed to shaft 22. The outer radial end of each crank 34 is operatively connected to the bracket 27 beneath it by a flexible member, shown as a length of chain 35. The lifting arms 34 are effective only in exerting an upward force on the header bars 17 to lift the harvester apparatus 10 from ground engagement or to set a lower elevational limit to movement of the harvester apparatus 10 with respect to the tractor 16, a rigid A-frame includground contact, there should be a slight amount of slack in the flexible chain 35.

The lifting arms 34 are operated at one side of the apparatus by means of a power crank 38 immediately adjacent to one of the cranks 34. The lifting crank 38 is rigidly fixed to the adjacent crank 34 and to shaft 22, so that the crank 38, the two cranks 34 and shaft 22 all pivot in unison. Such pivotal movement is accomplished by a conventional hydraulic cylinder assembly shown generally at 40. The outer end of the movable piston rod in assembly 40 is pivotally connected to the radial extension of crank 38 about an axis parallel to the central axis of shaft 22. The cylinder that moves the piston rod is anchored to the frame of tractor 16 in any suitable conventional manner.

Figure 3:
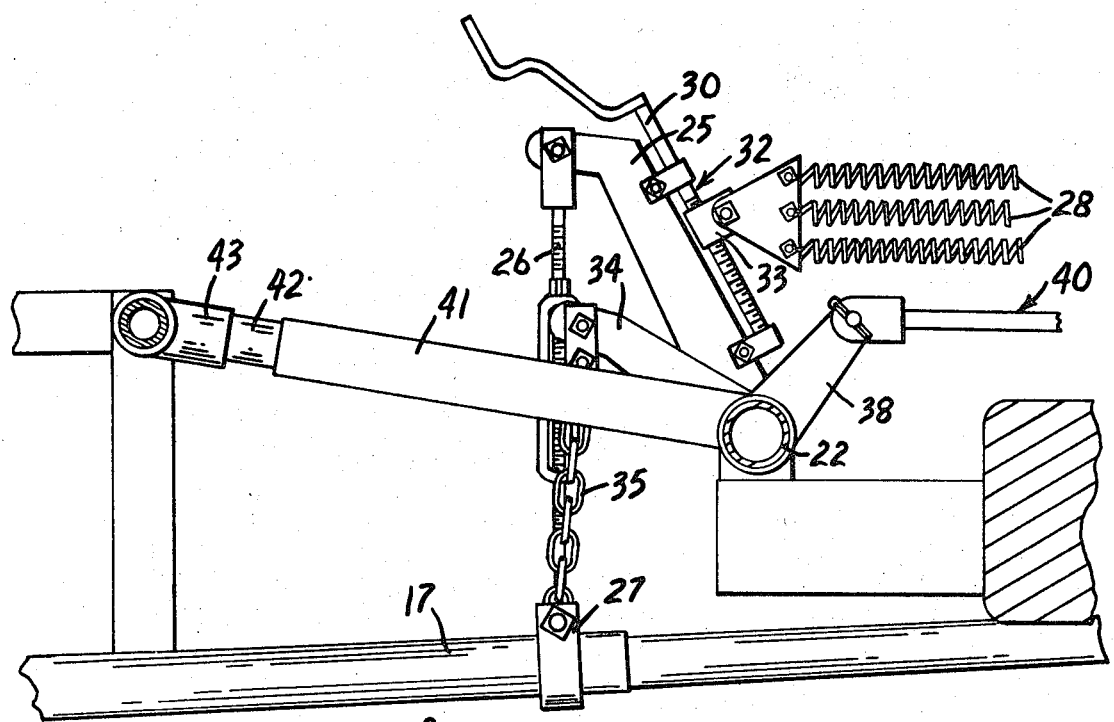
FIG. 3 is an enlarged sectional view taken substantially along line 3—3 in FIG. 2.

To prevent lateral movement of the harvester apparatus 10 with respect to the tractor 16, a rigid A-frame including two forwardly extending angular legs 41 is provided at the center of the apparatus. It can best be seen in FIGS. 2 and 3. The read end of each leg 41 is pivotally mounted about shaft 22 by suitable sleeve bearings. The A-frame structure is therefore freely pivotable with respect to shaft 22. The legs 41 converge at their forward ends and have a cylindrical extension 42 provided between them, the extension 42 being directed so as to bisect the legs 41. Extension 42 is slidably received within a complementary socket 43 pivotally mounted on the frame 11 of the harvester apparatus 10 about a transverse axis thereon. The extension 42 can pivot about its central longitudinal axis relative to socket 43. It is also capable of moving longitudinally along this axis relative to socket 43. The resulting connection between the A-frame and the harvester apparatus therefore does not impede vertical or angular movement of the harvester apparatus relative to the tractor. It does prevent lateral movement of the harvester apparaus 10 in a transverse direction with respect to tractor 16.

The combination of the swivel support provided to the header bars 17 at their rear ends and the limited restraint provided between the mechanisms that operatively connect the harvester apparatus 10 and the devices carried by shaft 22 provide a floating support for the harvester apparatus which permits free movement of the harvester with respect to the tractor. If one end of the harvester 10 should be raised elevationally relative to its opposite end, the resultant force directed through the header bars 17 will simply pivot the transverse bar 18 about a longitudinal axis on the tractor frame. This will result in the bar 18 shown in FIG. 5 being raised at one end and lowered at its opposite end. The elevational movement of the harvester will at the same time be accommodated by pivotal movement of the bar 18 about a transverse axis relative to the tractor frame, and the movement will not result in the binding of any of the movable supporting members. Since each side of the harvester is independently supported by the biasing springs 28, the ability of springs 28 to overcome that portion of the weight of the harvester normally supported thereby will not be decreased. Furthermore, any tendency of the harvester to move laterally will be prevented by the guiding function of the A-frame mounted at the center of shaft 22.

The counterbalancing effect of springs 28 can be adjusted as required by individual operating conditions. When it is necessary to lift the harvester this is accomplished by operation of the hydraulic cylinder assembly 40. Such operations are believed to be obviously understandable to those familiar with such equipment.

Particular details of bearings and pivotal connections have not been given herein, since such devices are well known in this type of equipment and well understood by those skilled in this art. Modifications can be made in precise details illustrated, and design modifications must obviously be made in applying the support apparatus to particular harvesting equipment and tractors. Such changes are believed to be obvious to one skilled in this field.

Having thus described our invention, we claim:

1. An apparatus for supporting a front-mounted crop harvesting apparatus, comprising:
   a pair of longitudinal header bars fixed at one end respectively to the crop harvesting apparatus, each header bar being pivoted to the tractor frame for movement about a longitudinal and a transverse axis thereon;
   a transverse shaft on the tractor frame intermediate the ends of the header bars, said shaft being centered along an axis located above the header bars;
   first bell crank means at each side of the shaft independently rotatable about the shaft axis and operatively connected to the respective header bars;
   second bell crank means fixed at each side of the shaft for motion in unison about the shaft axis, said second bellcrank means being flexibly connected to the respective header bars;
   adjustable biasing means between the tractor frame and the first bell crank means for applying a lifting force to the header bars so as to counteract the weight of the crop harvesting apparatus;
   and means operatively connected between the tractor frame and said second bell crank means for selectively lifting both header bars in unison.

2. The apparatus as set out in claim 1 wherein the rear end of each header bar is fixed to opposite ends of a transverse member;
   and a universal pivot joint joining the transverse member at its center and the tractor frame.

3. The apparatus as set out in claim 1 wherein the longitudinal header bars extend rearwardly from the crop harvesting apparatus beneath a substantial portion of the tractor frame;
   the rear ends of the header bars being conjointly connected to the tractor frame by a universal pivot joint.

References Cited

UNITED STATES PATENTS

| | | | |
|---|---|---|---|
| 2,413,873 | 1/1947 | Hume | 56—25 |
| 2,807,127 | 9/1957 | Scheidenhelm | 56—208 |
| 2,915,870 | 12/1959 | Hume | 56—208 |
| 2,955,813 | 10/1960 | Hume | 56—208X |

ROBERT PESHOCK, Primary Examiner

J. A. OLIFF, Assistant Examiner